United States Patent
Dawes et al.

(10) Patent No.: US 7,939,147 B2
(45) Date of Patent: May 10, 2011

(54) HEAT-SEALABLE AND SHRINKABLE MULTI-LAYER POLYMERIC FILM

(75) Inventors: Mark Edward Dawes, Middlesbrough (GB); Gary Victor Rhoades, North Yorkshire (GB); Stephen William Sankey, North Yorkshire (GB)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 1446 days.

(21) Appl. No.: 10/502,473

(22) PCT Filed: Jan. 21, 2003

(86) PCT No.: PCT/GB03/00233
§ 371 (c)(1),
(2), (4) Date: Aug. 30, 2004

(87) PCT Pub. No.: WO03/061957
PCT Pub. Date: Jul. 31, 2003

(65) Prior Publication Data
US 2005/0106342 A1    May 19, 2005

(30) Foreign Application Priority Data
Jan. 25, 2002  (GB) .................................. 0201764.8

(51) Int. Cl.
*B32B 1/08* (2006.01)
(52) U.S. Cl. .................... 428/34.9; 428/36.9; 428/36.91
(58) Field of Classification Search .................. 428/34.9, 428/36.9, 36.91; 206/557
See application file for complete search history.

(56) References Cited

U.S. PATENT DOCUMENTS

| 2,762,720 A | 9/1956 | Michel |
| 3,442,436 A * | 5/1969 | Kirby, Jr. .................... 229/87.05 |
| 4,333,968 A | 6/1982 | Nahmias |
| 4,576,409 A | 3/1986 | Ebert |
| 5,130,189 A * | 7/1992 | Hart .............................. 428/331 |
| 5,663,030 A | 9/1997 | Malhotra |
| 5,882,798 A | 3/1999 | Hubbard et al. |
| 5,888,635 A | 3/1999 | Yang et al. |
| 5,925,428 A | 7/1999 | Hubbard et al. |
| 6,105,776 A * | 8/2000 | Meilhon ....................... 206/497 |
| 2001/0008240 A1 | 7/2001 | Herrin |

FOREIGN PATENT DOCUMENTS

| EP | 0 111 819 | 6/1984 |
| EP | 0 289 162 | 11/1988 |
| EP | 0 349 141 | 1/1990 |

(Continued)

OTHER PUBLICATIONS

Translation of Japanese Notice of Rejection dated Jun. 3, 2008.

*Primary Examiner* — Alicia Chevalier
(74) *Attorney, Agent, or Firm* — RatnerPrestia

(57) ABSTRACT

An open-ended tube comprising walls of a heat-sealable multi-layer polymeric film, wherein said film comprises an outer shrinkable substrate layer and an inner heat-sealable layer, wherein said substrate layer has a degree of shrinkage in the longitudinal dimension of the tube of about 0% to about 50% over the temperature range 55 to 100° C., and a degree of shrinkage in the transverse dimension of the tube of 5 to about 70% over the temperature range 55 to 100° C.; and use thereof in the manufacture of packaging for a container suitable as a receptable for a ready-prepared ovenable meal.

37 Claims, 2 Drawing Sheets

FOREIGN PATENT DOCUMENTS

| | | |
|---|---|---|
| EP | 0 408 197 | 1/1991 |
| EP | 0 429 179 | 5/1991 |
| EP | 0 563 442 | 10/1993 |
| EP | 0 576 179 | 12/1993 |
| EP | 0 680 409 B1 | 11/1995 |
| EP | 0 696 516 | 2/1996 |
| EP | 1033319 A1 * | 9/2000 |
| GB | 1077813 | 8/1967 |
| GB | 2024715 | 1/1980 |
| GB | 2250408 | 6/1992 |
| GB | 2280342 | 1/1995 |
| JP | 57 15958 A | 1/1982 |
| JP | 60 253545 A | 12/1985 |
| JP | 10-4866 A | 1/1989 |
| JP | 3 63133 A | 3/1991 |
| JP | 3 121842 A | 5/1991 |
| JP | 10 513218 | 12/1998 |
| JP | 2001 277429 A | 10/2001 |
| WO | WO 96/19333 | 6/1996 |
| WO | WO 97/37849 | 10/1997 |
| WO | WO 9962982 A1 * | 12/1999 |
| WO | WO 01/54886 A1 | 8/2001 |
| WO | WO 02/26493 A1 | 4/2002 |
| WO | WO 02/059186 A1 | 8/2002 |
| WO | WO 03/026892 A1 | 4/2003 |

* cited by examiner

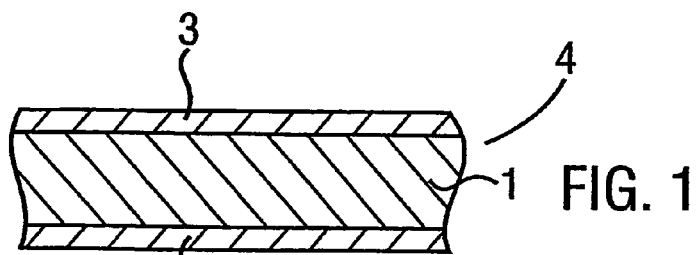
FIG. 1
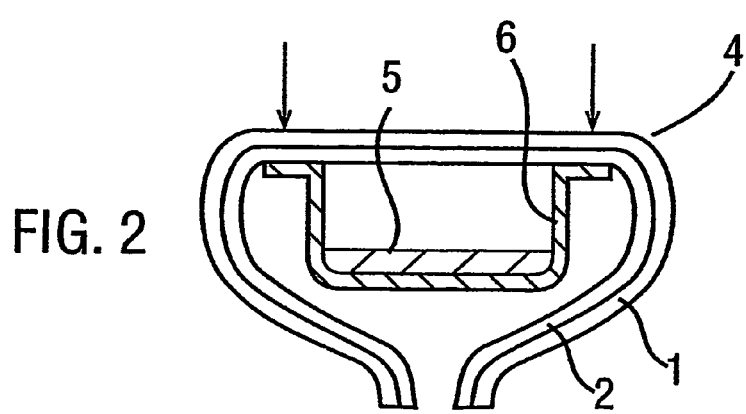
FIG. 2
FIG. 3a
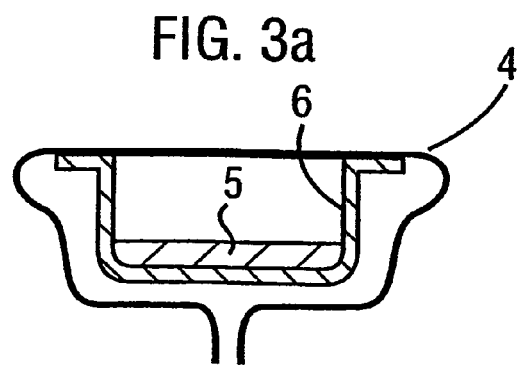
FIG. 3b
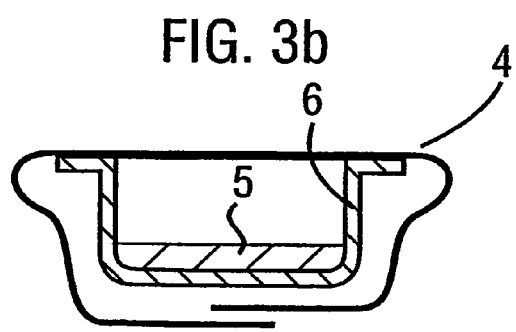
FIG. 4
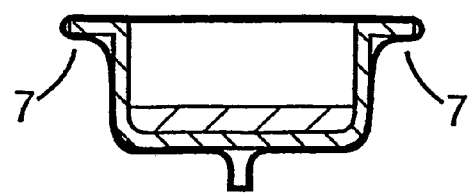

HEAT-SEALABLE AND SHRINKABLE MULTI-LAYER POLYMERIC FILM

This invention relates to a multi-layer polymeric film suitable for use as packaging for a container, particularly a container of ready-prepared ovenable meals. In particular, the invention relates to a multi-layer film which is heat-sealable to and peelable from a container, and which is also shrinkable.

Plastic containers have been increasingly used in packaging applications, such as food packaging, and in particular for packaging convenience foods, for example ready-prepared ovenable meals which may be warmed either in a microwave oven or in a conventional oven or in either. A container which is suitable for use either in a microwave oven or a conventional oven is generally referred to as "dual-ovenable". Often the plastic container is an APET/CPET tray (a composite material having an amorphous polyethylene terephthalate layer on top of a crystalline polyethylene terephthalate layer). Polystyrene and polypropylene containers have also been used. The plastic container is generally used in association with a lid which seals the container in order to prevent leakage and drying out of the packaged contents during storage. In addition, the lid should not stick to the packaged contents and should be able to withstand the heat generated in the oven.

Such container lids normally comprise a multi-layer film, often referred to as a "lidding film", which comprises a flexible polymeric substrate, such as biaxially oriented polyester film, and a heat-sealable coating layer.

The manufacture of sealed containers using lidding films involves the formation of a seal between the lidding film and the container. This seal is formed by placing the lid on top of the container and applying heat and pressure in order to soften or melt the sealable coating layer so that it adheres to the surface of the container and forms an effective seal between the lid and the container. The seal must be strong enough to prevent leakage of the contents. In some circumstances, the film lid is required to be peelable from the container by the consumer and in such cases the seal must be strong enough to prevent leakage of the contents but must not result in difficulties in removing the lid when the container is to be opened. In particular, the lid should not tear during peeling, which could result in portions seal and easy-peeling properties, i.e. a clean peel, may be required at both low, e.g. ambient, and high temperatures, e.g. after heating the packaged food contents in an oven.

For the purpose of providing a heat-sealable film, particularly a heat-sealable peelable film, it is desirable to be able to control the thickness of the sealable coating layer. A thinner coating layer has better peelability and is more economical but, if too thin, may not provide sufficient adhesion or prevent leakage of contents. A layer of heat-sealable coating which is too thick may cause tearing of the film on opening due to the increased heat-seal bond strength.

In prior art lidding films, the heat-sealable layer has often been applied to the substrate using either an organic solvent, or an aqueous dispersion or solution. The use of organic solvents is generally disadvantageous because they may be harmful, hazardous in use, or toxic and detrimental to the environment. In addition, films made in this way often contain a residual amount of solvent, and so may not be suitable for use in applications where they come into contact with food products. The use of organic solvents usually involves an "off-line" coating step, i.e. after any stretching and subsequent heat-setting operation employed during the manufacture of the substrate, since such solvents can cause sticking or blocking of the film during the normal winding operations used during film manufacture. The use of an aqueous dispersion or solution, such as in the process of WO-A-96/19333, avoids the use of substantial amounts of organic solvents; allows the use of a more efficient "in-line" coating process, i.e. wherein the coating layer is applied either before the film substrate is stretched or between the stretching steps of a biaxial stretching process; but is limited to coating compositions which are soluble or adequately dispersible in water. An in-line process avoids the use of the further heating or drying steps which are encountered in off-line coating processes, particularly off-line solvent-coating processes. These processes can embrittle the film and deteriorate the tensile properties. In general, an in-line coated film has therefore superior mechanical properties.

Heat-sealable films have also been manufactured by other in-line coating techniques. For instance, GB-2024715 discloses the application of a polyolefinic material onto a polyolefinic substrate using an extrusion-coating technique between the longitudinal and transverse stretching operations ("inter-draw" coating). A process for the in-line inter-draw extrusion-coating of polyolefins onto a polyester substrate to produce a heat-sealable film is disclosed in GB-1077813. U.S. Pat. No. 4,333,968 discloses a method for the inter-draw extrusion coating of an ethylene-vinyl acetate (EVA) copolymer onto a polypropylene substrate to provide a heat-sealable peelable film.

Traditionally, ready-prepared ovenable meals are sold to the customer in packaging which not only comprises a sealed container, but which also comprises a sleeve surrounding this sealed container. The sealed container is removed from the sleeve prior to cooking. This sleeve is often made from cartonboard or paperboard and has printed thereon an image of the ready-prepared meal. In addition, the sleeve may also display printed instructions for the storage and/or cooking of the meal. This additional packaging component adds to the cost of manufacture but is seen as essential to the sale of ready-prepared ovenable meals simply because of the necessity to provide adequate instructions to the consumer. In addition, the sleeve protects the lidding film of the sealed container from damage or puncture during storage and transport, and provides rigidity to the whole package.

It is an object of the present invention to provide a more economical packaging means for a ready-prepared ovenable meal, particularly a packaging means which avoids the use of an additional sleeve about a sealed container. It is a further object of this invention to provide a heat-sealable and shrinkable film, particularly a heat-sealable, peelable and shrinkable film, which is suitable for use as a packaging means for a ready-prepared ovenable meal.

According to the present invention there is provided a heat-sealable multi-layer polymeric film comprising a shrinkable substrate layer of polymeric material having on a surface thereof a heat-sealable layer, wherein said shrinkable substrate layer has a degree of shrinkage in a first dimension of about 0% to about 50% over the temperature range 55 to 100° C., and a degree of shrinkage in a second orthogonal dimension of about 5 to about 70% over the temperature range 55 to 100° C., with the proviso that the heat-sealable multi-layer polymeric film does not comprise a further shrinkable layer laminated to said shrinkable substrate layer.

According to a further aspect of the present invention, there is provided an open-ended tube comprising walls of a heat-sealable multi-layer polymeric film, wherein said film comprises an outer shrinkable substrate layer and an inner heat-sealable layer, wherein said substrate layer has a degree of shrinkage in the longitudinal dimension of the tube of about 0% to about 50% over the temperature range 55 to 100° C., and a degree of shrinkage in the transverse dimension of the tube of about 5 to about 70% over the temperature range 55 to 100° C.

As the skilled person is aware, the dimensions of a polymeric film are defined in terms of the "machine direction" and the "transverse direction", which correspond to the axes of the film production apparatus. The machine direction is the direction of travel along the film production line and corresponds to the lengthways dimension of the film. The transverse direction is the direction orthogonal to the direction of travel of the film during manufacture and corresponds to the widthways dimension of the film.

Preferably said first dimension of the film corresponds to the machine direction, and said second orthogonal dimension of the film corresponds to the transverse direction.

Conveniently, the longitudinal dimension of the tube corresponds to the machine direction of the film from which it is made; and the transverse direction of the tube corresponds to the transverse direction of the film from which it is made.

Reference herein to the longitudinal dimension of the tube is to the dimension of the wall which is substantially parallel to the axis of the tube. The transverse dimension of the tube is orthogonal to the longitudinal dimension and is in the plane defined by the cross-section which has the tube axis at its centre. Where the tube is a cylinder, the transverse dimension is the circumference of the cylinder at any given point along the tube axis.

In one embodiment, the multi-layer film and open-ended tube have a plurality of separating means which enable one multi-layer portion of the film to be separated from an adjacent multi-layer portion of the film, i.e. wherein the cleavage is in a direction substantially orthogonal to the plane defined by the boundary between the substrate and heat-sealable layers. Said separation is suitably effected by cleavage along a dimension which is substantially parallel to the longitudinal dimension of the tube. Suitably, the open-ended tube and multi-layer film have two such separating means, thereby allowing the tube to be separable into two principal sections, as described in more detail below. The separating means can take the form of a set of perforations, suitably a set of perforations which extends along a dimension of the tube which is substantially parallel to its longitudinal dimension, or to the machine direction of the film. In an alternative embodiment, each separating means takes the form of a "tear strip" extending along the longitudinal dimension of the tube, the tear strip typically comprising two parallel sets of perforations, each set being spaced about 5 mm to 20 mm apart from each other, such that the tear strip is removable by holding one end thereof and applying a force that has a component normal to the surface of the tube and a component parallel to the longitudinal dimension of the tube. The use of two such tear strips thereby allows the tube to be separated into two principal sections (i.e. excluding the portions of the tube which comprise the tear strips).

In a further embodiment, there is no discrete separating means. In this embodiment, the film surface is printed with instructions for the consumer to separate the film into two principal portions, for instance, the printed material may include two sets of guide-lines which align along the longitudinal dimension of the tube together with instructions for the consumer to cut along these guide-lines.

The present invention may be used in accordance with the following basic steps:
(i) the multi-layer film is first formed, as described in more detail hereinbelow;
(ii) the multi-layer film may then be printed;
(iii) separating means may then be incorporated into the film, for instance by disposing a plurality of sets of substantially parallel sets of perforations along one dimension (preferably the machine direction) of the film, as described in more detail below;
(iv) the film is positioned over or around the container to be sealed, with the heat-sealable layer in contact with the container, and the film is then sealed to the upper surfaces of the walls of the container thereby forming a "lid portion" which seals the container and its contents. Where the film comprises discrete separating means, such as two substantially parallel series of perforations (or two tear strips), it will be appreciated that the portion of the film which is contacted with the container is the portion of the film which is between said two substantially parallel series of perforations or said two tear strips. Equally, it will be appreciated that where the film is printed with cutting guide-lines for the consumer, the portion of the film which is contacted with the container is the portion of the film which is between said guide-lines. The dimensions of the "lid portion" of the film are defined by the dimensions of the container to which the film is sealed;
(v) a tube is formed by wrapping the film around opposing sides and the underside of the container, and then sealing one end portion of the film to the other end portion of the film, such that the container is disposed within the tube; and
(vi) the container and sealed tube are then exposed to heat in order to effect shrinkage of the tube, thereby ensuring that the tube fits closely and securely around the container.

As described below, the above steps are not necessarily arranged in the preferred order of performance. For instance, formation of the tube could precede the positioning of the film around the container and subsequent sealing of the container. Thus, a pre-formed tube could be positioned around the container and its contents and the tube sealed to the container to form the lid portion. Alternative sequences of steps are described in more detail below.

The invention is further described hereinbelow primarily with reference to the embodiment wherein the film or tube comprises the aforementioned discrete separating means, which is the preferred embodiment of the present invention. It will be appreciated, however, that the following description of the film and tube and the methods of use thereof, is also applicable to the alternative embodiment wherein the film and tube comprises only the aforementioned printed cutting guide-lines.

It will be appreciated that the two separating means are disposed on opposing sides of the packaging of the sealed container. The portion of the tube which surrounds the sides and underside of the container, i.e. the portion of the tube which is not the "lid portion", is referred to herein as the "base portion". In a preferred embodiment, the two separating means separate the "base portion" of the tube from the "lid portion" of the tube.

In use, prior to subjecting the contents of the container to a cooking cycle, the tube is separated into multiple portions, preferably into a lid portion and a base portion, by tearing along the perforations of the separating means. The lid portion remains sealed onto the container. The sealed container is then subjected to the cooking cycle in an oven. The base portion, which may comprise on a surface thereof printed instructions for storage, cooking or serving, or nutritional information, may be retained for reference by the consumer during the cooking cycle.

A film according to the present invention is advantageous in that it minimises the amount of packaging required for a ready-prepared ovenable meal.

The heat-sealable multi-layer film described herein is preferably a heat-sealable peelable multi-layer film film. As used herein, the term "heat-sealable peelable film" refers to a film which is capable of forming a seal to a surface under the application of heat, wherein the seal is breakable without fracture of the film.

The substrate layer described herein may shrink in both dimensions, or in only one dimension. If there is shrinkage in only one dimension, it is preferred that this dimension is the transverse dimension.

Where there is shrinkage in both dimensions, the degree of shrinkage in one dimension may be the same as, or different to, the degree of shrinkage in the other orthogonal direction. Where there is shrinkage in both dimensions, it is preferred that the ratio of shrinkage at 100° C. in the transverse dimension relative to that in the longitudinal dimension is in the range from 1:1 to 10:1. Preferably the shrinkage in the transverse dimension is greater than the shrinkage in the longitudinal dimension, i.e. the ratio of shrinkage at 100° C. in the transverse dimension relative to that in the longitudinal dimension is greater than 1:1.

Preferably, the substrate layer has a degree of shrinkage in said first dimension (preferably its machine direction, i.e. in the longitudinal dimension of the tube) of about 0% to about 30%, preferably about 0% to about 20%, and typically about 0% to about 10%, over the temperature range 55 to 100° C. Preferably, the substrate layer has a degree of shrinkage in said second orthogonal dimension (preferably its transverse dimension, i.e. the transverse dimension of the tube) of about 5% to about 50%, preferably about 5% to about 30%, and typically about 5% to about 20%, over the temperature range 55 to 100° C. In one embodiment, the substrate layer has a degree of shrinkage in said second orthogonal dimension (preferably its transverse dimension, i.e. the transverse dimension of the tube) of at least 10% over the temperature range 55 to 100° C.

As the skilled person is aware, the shrinkage characteristics of a film are determined by the stretch ratios and degree of heat-setting employed during its manufacture. The shrinkage behaviour of a film which has not been heat-set corresponds to the degree to which the film has been stretched during its manufacture. In the absence of heat-setting, a film which has been stretched to a high degree will exhibit a high degree of shrinkage when subsequently exposed to heat; a film which has only been stretched by a small amount will only exhibit a small amount of shrinkage. Heat-setting has the effect of providing dimensional stability to a stretched film, and "locking" the film in its stretched state. Thus, the shrinkage behaviour of a film under the action of heat depends on whether, and to what extent, the film was heat-set after any stretching operation(s) effected during its manufacture. In general, a film which has experienced a temperature $T_1$ during the heat-setting operation will exhibit substantially no shrinkage below temperature $T_1$ when subsequently exposed to heat after manufacture.

Accordingly, in order to obtain the required shrinkage characteristics, the film from which the tube is made must have been uniaxially or biaxially stretched, depending on whether symmetrical shrinkage is required. The film may be partially heat-set after stretching has been effected, or is not heat-set after stretching has been effected.

A multi-layer film according to the present invention typically exhibits a heat-seal value (at ambient temperatures) in the range of 200 to 1400 g/25 mm$^2$, preferably in the range of about 200 to about 1000 g/25 mm$^2$, when sealed to a standard APET/CPET tray. Typical heat seal strengths of the film to itself are in the range of 600-800 g/25 mm$^2$.

The respective layers of the multi-layer film are described in more detail below.

The substrate layer is a self-supporting film or sheet by which is meant a film or sheet capable of independent existence in the absence of a supporting base. The substrate layer is required to act as the container lid and sleeve and must exhibit a degree of shrinkage in at least one direction, as defined above. Thus, the substrate layer must exhibit a degree of shrinkage in one dimension (preferably the machine dimension) of about 0% to about 50% over the temperature range 55 to 100° C., and a degree of shrinkage in the other dimension (preferably the transverse dimension) of about 5 to about 70% over the temperature range 55 to 100° C. Where the film shrinks in both dimensions, it is preferred that the ratio of shrinkage at 100° C. in the transverse dimension relative to that in the machine dimension is in the range from 1:1 to 10:1. Preferably the shrinkage in the transverse dimension is greater than the shrinkage in the machine dimension, i.e. the ratio of shrinkage at 100° C. in the transverse dimension relative to that in the machine dimension is greater than 1:1.

The substrate layer preferably comprises thermoplastic polymeric material. Such materials include a homopolymer or copolymer of a olefin, such as ethylene, propylene and but-1-ene, polyamides, polycarbonates, polyesters (including copolyesters), PVC, PVA, polystyrenes, polyacrylates, celluloses and nylon (including nylon 6 and nylon 6,6). Particularly preferred is a polyester material, and particularly a synthetic linear polyester.

The synthetic linear polyesters useful for formation of the substrate layer may be obtained by condensing one or more dicarboxylic acids or their lower alkyl diesters, e.g. terephthalic acid, isophthalic acid, phthalic acid, 2,5-, 2,6- or 2,7-naphthalenedicarboxylic acid, succinic acid, sebacic acid, adipic acid, azeleic acid, 4,4'-diphenyldicarboxylic acid, hexahydro-terephthalic acid or 1,2-bis-p-carboxyphenoxy-ethane (optionally with a monocarboxylic acid, such as pivalic acid) with one or more glycols, particularly an aliphatic or cycloaliphatic glycol; e.g. ethylene glycol, 1,3-propanediol, 1,4-butanediol, neopentyl glycol and 1,4-cyclohexanedimethanol. Aromatic dicarboxylic acids are preferred. Aliphatic glycols are preferred.

In one embodiment, the substrate layer comprises polyethylene terephthalate (PET), or copolyesters in which the major repeat unit is ethlyene terephthalate.

In a preferred embodiment, the substrate layer comprises a copolyester of terephthalic acid (TPA) and isophthalic acid (IPA) with one or more diols selected from the group consisting of aliphatic and cycloaliphatic diols. Preferably, the molar ratios of the isophthalate polyester units to the terephthalate polyester units are from 1 to 40 mol % isophthalate and from 99 to 60 mol % terephthalate, preferably from 15 to 20 mol % isophthalate and from 85 to 80 mol % terephthalate. The terephthalic acid/isophthalic acid copolyester may be obtained by condensation polymerisation of terephthalic acid and isophthalic acid with one or more, and preferably one, diol as set out above, preferably an aliphatic diol, more preferably ethylene glycol. In a particularly preferred embodiment, the substrate layer comprises a copolyester comprising substantially 18 mol % ethylene isophthalate and 82 mol % ethylene terephthalate.

The substrate may comprise one or more discrete layers of the above film-forming materials. The polymeric materials of the respective layers may be the same or different. For instance, the substrate may comprise one, two, three, four or five or more layers and typical multi-layer structures may be of the AB, ABA, ABC, ABAB, ABABA or ABCBA type. Preferably, the substrate comprises two or three layers, which is preferably an AB or ABA layer structure, more preferably a two layer AB structure.

In a particularly preferred embodiment, the substrate comprises an AB or ABA layer structure wherein the B-layer comprises PET or a TPA/IPA copolymer as described above, preferably a TPA/IPA copolymer, and the A-layer comprises a copolyester of terephthalic acid with two or more aliphatic glycols, preferably ethylene glycol and: 1,4-cyclohexane dimethanol, preferably a copolyester having about 30-35 mole %, preferably about 33 mole % 1,4-cyclohexane dimethanol and about 65-70 mole %, preferably about 67 mole % ethylene glycol. Where the multi-layer structure is of the AB-type structure wherein the B-layer comprises PET or a TPA/IPA copolymer as described above, preferably a TPA/IPA copolymer, it is the A-layer onto which is formed the heat-sealable layer.

In an alternative embodiment, the substrate layer comprises a copolyester of terephthalic acid with two or more aliphatic glycols, preferably ethylene glycol and 1,4-cyclohexane dimethanol, preferably a copolyester having about 30-35 mole %, preferably about 33 mole % 1,4-cyclohexane dimethanol and about 65-70 mole %, preferably about 67 mole % ethylene glycol.

In a further alternative embodiment, the substrate layer comprises a copolymer of terephthalic acid, dihydroxyethyl azeleic acid and ethylene glycol, preferably wherein the dicarboxylic acid components of the copolymer are in a molar ratio of about 90-99% terephthalic acid and about 1-10% dihydroxyethyl azeleic acid, particularly about 95% terephthalic acid and about 5% dihydroxyethyl azeleic acid.

The heat-sealable layer is any layer capable of forming a heat-seal bond to the surfaces of the container. The heat-sealable layer comprises polymeric material which should soften to a sufficient extent that its viscosity becomes low enough, to allow adequate wetting for it to adhere to the surface to which it is being bonded. The heat-seal bond is effected by heating to soften the polymer material of the heat-sealable layer, and optionally applying pressure, without melting the other layers in the film. Thus, the polymer of the heat-sealable layer should begin to soften at a temperature such that the heat-seal bond can be formed at a temperature which is less than the melting temperature of the polymeric material in the other layers of the film. In one embodiment, the polymer of the heat-sealable layer should begin to soften at a temperature such that the heat-seal bond can be formed at a temperature which is between about 0.5 and 50° C. below, preferably between about 5 and 30° C. below, and preferably at least about 100° C. below the melting temperature of the polymer material of the other layers in the film.

The heat-sealable layer suitably comprises a polymer such as a polyester, an EVA resin (such as those obtainable from E. I. du Pont de Nemours and Company under the trade name Elvax®) or a polyolefin (such as a modified polyethylene). Where the film is intended for packaging of a dual-ovenable ready-prepared meal, the heat-sealable layer comprises a polyester. Heat-sealable layers comprising an EVA resin or polyolefin are generally only suitable for the packaging of a ready-prepared meal intended for heating in a microwave oven only.

Preferably the heat-sealable layer comprises a polyester, particularly a copolyester resin derived from one or more dicarboxylic acid(s) or their lower alkyl (up to 14 carbon atoms) diesters with one or more glycol(s), particularly an aliphatic or cycloaliphatic glycol, preferably an aliphatic glycol, and more preferably an alkylene glycol. Suitable dicarboxylic acids include aromatic dicarboxylic acids such as terephthalic acid, isophthalic acid, phthalic acid, or 2,5-, 2,&- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Ethylene glycol or 1,4-butanediol is preferred.

Preferably, the heat-sealable layer comprises a copolyester derived from at least two dicarboxylic acids. Formation of the copolyester is conveniently effected in known manner by condensation, or ester-interchange, at temperatures generally up to 275° C.

In a preferred embodiment, the copolyester of the heat-sealable layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the copolyester is preferably in the range from 45 to 80, more preferably 50 to 70, and particularly 55 to 65 mole % based on the dicarboxylic acid components of the copolyester. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters are (i) copolyesters of azeleic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol (preferably having the components in the relative molar ratios of 45-55/55-45/100, more preferably 50/50/100) having a glass transition point ($T_g$) of −40° C. and a melting point ($T_m$) of 117° C.), and a copolyester of azeleic acid/terephthalic acid/ethylene glycol (preferably having the components in the relative molar ratios of 40-50/60-50/100, more preferably 45/55/100) having a $T_g$ of −15° C. and a $T_m$ of 150° C.

In an alternative embodiment, the heat-sealable layer comprises a copolyester derived from an aliphatic diol and a cycloaliphatic diol with one or more, preferably one, dicarboxylic acid(s), preferably an aromatic dicarboxylic acid. Typical polyesters which provide satisfactory heat-sealable properties include copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. In a preferred embodiment the copolyester is a copolyester of terephthalic acid with about 33 mole % 1,4-cyclohexane dimethanol and about 67 mole % ethylene glycol. An example of such a polymer is PETG™ 6763 (Eastman) which comprises a copolyester of terephthalic acid, about 33% 1,4-cyclohexane dimethanol and about 67% ethylene glycol and which is always amorphous. In an alternative embodiment of the invention, the heat-sealable layer may comprise butane diol in place of ethylene glycol.

The thickness of the multi-layer film is preferably between about 20 to 300 µm, more preferably between about 25 and 100 µm, and typically is from about 30 to about 55 µm in thickness.

The thickness of the substrate layer is generally in the range of from about 5 to about 250 µm, preferably from about 10 to about 150 µm, preferably about 12 µm to about 75 µm, and typically from about 35 to about 40 µm.

The thickness of the heat-seal layer is generally between about 1 and 30% of the thickness of the substrate layer. The heat-sealable layer may have a thickness of up to about 50 µm, preferably up to about 25 µm, more preferably up to about 15 µm, more preferably up to about 10 µm, more preferably between about 0.5 and 6 µm, and more preferably between about 0.5 and 4 µm. A thicker heat-sealable layer will generally form a stronger heat-seal bond.

According to a further aspect of the present invention there is provided a process for the production of a multi-layer polymeric film which comprises the steps of:

(i) forming a polymeric film substrate having a degree of shrinkage in one dimension (preferably the machine dimension) of about 0% to about 50% over the temperature range 55 to 100° C., and a degree of shrinkage in the other dimension (preferably the transverse dimension) of about 5 to about 70% over the temperature range 55 to 100° C.;

(ii) providing a heat-sealable layer on a first surface of said polymeric film substrate wherein said heat-sealable layer is provided by coextrusion of the respective film-forming polymeric materials of the substrate and heat-sealable layers or by coating a surface of the substrate with the polymeric material of the heat-sealable layer;

(iii) optionally providing a printable or ink-receiving layer on the surface of the substrate opposite to the surface which is in contact with the heat-sealable layer, and optionally printing onto said printable or ink-receiving layer; and (iv) optionally incorporating separating means in the film, for instance by forming a plurality of sets of substantially parallel perforations in the film.

Perforations may be introduced using any conventional technique well known in the art, for instance by mechanical punching, scoring or flame or laser ablation.

It will be appreciated that the process described above excludes processes wherein the heat-sealable layer is applied to the substrate layer using lamination techniques.

Formation of the substrate may be effected by conventional techniques well-known in the art. Conveniently, formation of the substrate is effected by extrusion which, in general terms, comprises the steps of extruding a layer of molten polymer, quenching the extrudate and orienting the quenched extrudate in at least one direction.

The substrate may be uniaxially-oriented, but is preferably biaxially-oriented. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the substrate-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between twos pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. The actual heat-set temperature and time will vary depending on the composition of the film but should not be selected so as to substantially degrade the tear resistant properties of the film. Within these constraints, a heat set temperature of about 80° to 250° C. is generally desirable, as described in GB-A-838708.

Where the substrate comprises more than one layer, preparation of the substrate is conveniently effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a multi-layer polymeric film, which may be oriented and heat-set as hereinbefore described. Formation of a multi-layer substrate may also be effected by casting, for example, the first layer onto a preformed second layer.

Prior to formation of the heat-sealable layer on the substrate, the exposed surface of the substrate may, if desired, be subjected to a chemical or physical surface-modifying treatment to improve the bond between that surface and the subsequently applied layer A preferred treatment, because of its simplicity and effectiveness, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

Formation of the heat-sealable layer by co-extrusion with the polymeric material of the substrate, for instance as described herein, may be used for heat-sealable layers comprising a polyester, an EVA resin or a polyolefin.

Formation of the heat-sealable layer on the substrate layer using a coating technique may be effected using suitable coating techniques known in the art. The choice of coating technique will largely depend on the identity of the polymeric material of the heat-sealable layer. The heat-sealable layer may be coated using an in-line or off-line process, preferably and in-line process, and more preferably an inter-draw in-line coating process. The heat-sealable layer may be coated from a solution, dispersion or suspension of the polymeric material, or as a spray. The heat-sealable layer may also be coated in its molten form using an extrusion or melt-coating technique, preferably a melt-coating technique.

Extrusion-coating is described by K. A. Mainstone in Modern Plastics Encyclopedia, 1983-84, Vol. 60, No. 1A, Edition 1, pp 195-198 (McGraw-Hill, N.Y.) and also by Franz Durst and Hans-Günte Wagner in Liquid Film Coating (Chapman and Hall; 1997; Eds S. F. Kistler and P. M. Schweizer; Chapter 11a). The extrusion-coating process is generally used for polymers of medium or high viscosity (at least 50 Pa.s and up to about 5000 Pa.s) and generally employs an air-gap (typically about 6 inches (15 cm)) between the die and the substrate. The use of an in-line extrusion-coating technique is restricted not only to polymers which have the appropriate viscosity, but also to polymers which do not lead to sticking or blocking problems in subsequent processing of the film.

In a preferred embodiment of the invention, the formation of a heat-sealable layer is effected by a melt-coating technique, as described in more detail below, particularly wherein the heat-sealable layer is a polyester or an EVA resin, and particularly wherein the heat-sealable layer is a polyester.

In a preferred embodiment, steps (i) and (ii) of the process for production of said film described above are effected by a melt-coating process comprising the steps of:
  (a) melt-extruding said substrate layer of polymeric material;
  (b) stretching said substrate in a first direction;
  (c) optionally stretching said substrate in a second orthogonal direction;
  (d) optionally heat-setting the stretched film;
  (e) forming a heat-sealable coating layer on a surface of the substrate by melt-coating directly thereon a molten polymeric material; and
  (f) cooling the coated substrate,
wherein coating step (e) is prior to step (b) or between steps (b) and (c).

The melt-coating process is particularly suitable for applying a heat-sealable coating layer having a thickness of less than about 8 μm. In addition, the melt-coating process is particularly suitable for heat-sealable coating layers comprising a copolyester. Preferably the melt-coating process described above involves the stretching of the substrate in said second orthogonal direction and, in that case, the melt-coating step (e) is preferably between steps (b) and (c).

In a preferred melt-coating process, particularly wherein the heat-sealable coating layer is a copolyester comprising repeating units of terephthalate, the process further comprises the step of adding water to the polymeric material of the coating layer prior to the coating step. Preferably the water is added in an amount of up to about 3000 ppm, more preferably up to about 2500 ppm, more preferably up to about 2000 ppm, and most preferably up to about 1600 ppm by weight of the copolyester of the coating layer. Preferably the water is added in an amount of at least 500 ppm, more preferably at least 600 ppm, more preferably at least 1000 ppm, and most preferably at least 1300 ppm by weight of the copolyester of the coating layer. The water may be added by allowing the polymer to absorb a controlled amount of atmosphere moisture, or by adding a known quantity of water to the polymer chip. In either case, it is pragmatic to start with dry polymer and then condition the polymer to the desired water content. The preferred method is to pass air of a known humidity and temperature through a vessel containing the polymer, for a predetermined duration. Measurements of the moisture uptake by the polymer can be readily calculated by standard analytical techniques. If insufficient water is present in the coating composition, the melt-coatability of the copolyester becomes very difficult and/or the heat-seal bond is too strong for peelability. If the copolyester comprises too much water, then the heat-sealability of the coating layer becomes inadequate, and the finished film may also exhibit undesirable "bloom" (a white residue within or on the surface of the film).

As used herein, the term "melt-coating" refers to a coating method characterised in that:
  (1) a coating liquid is forced through a coating die onto a substrate so as to provide a uniform liquid flow rate over the width of the coating die;
  (2) said coating die comprises a distribution chamber, a feed slot, and downstream and upstream die lips, wherein said feed slot separates said downstream and upstream die lips, and wherein the domain bounded by the die lips and the substrate defines a coating gap;
  (3) the coating gap under the downstream die lip is filled by the coating liquid; and
  (4) the coating gap under the upstream die lip is unfilled, partially filled or completely filled by the coating liquid, but is preferably partially or completely filled by the coating liquid.

The coating gap in the melt-coating method is small in relation to that in other coating methods such as extrusion-coating. The coating gap in melt-coating is preferably between 2 and 10 times the thickness of the wet coating layer. In some cases, the coating gap can be less than twice, or more than 10 times, the thickness of the wet coating layer, depending on factors such as the viscosity of the coating liquid, the line speed of coating, and the dimensions and geometry of the coating die. Melt-coating methods and the equipment useful therefor are described in more detail by Franz Durst and Hans-Gunte Wagner (Liquid Film Coating; Chapman & Hall; 1997; Eds. S. F. Kistler and P. M. Schweizer, Chapter 11a; in which melt-coating is referred to as "slot-coating"), the disclosure of which is incorporated herein by reference.

In melt-coating, the viscosity of the molten coating liquid at the point of application to the substrate must not be too high otherwise the polymer will not flow properly, resulting in difficulties in coating and uneven coat thicknesses. Preferably the viscosity of the coating layer polymer at the processing temperature is no more than about 50 Pa.s, preferably no more than about 30 Pa.s, more preferably no more than about 20 Pa.s, and is typically at least 0.005 Pa.s, preferably at least 0.1 Pa.s, more preferably at least 1 Pa.s, more preferably at least 2 Pa.s, more preferably at least 5 Pa.s and particularly at least 10 Pa.s. Typical operating temperatures at which the polymer should exhibit such melt viscosities are in the range of 200 to 260° C., particularly 220 to 250° C., and more particularly 230 to 250° C.

In the melt-coating process described above, the coating liquid is applied from the coating die directly onto the substrate which it is desired to coat.

Preferred copolyesters in the melt-coating process described above are those derived from at least two dicarboxylic acids, preferably an aromatic dicarboxylic acid and an aliphatic dicarboxylic acid, as described above. A particularly preferred copolyester is one derived from sebacic acid and terephthalic acid with an aliphatic glycol, preferably butylene glycol, as described above. Such a copolyester preferably has a glass transition point of less than 10° C., more preferably less than 0° C., particularly in the range from −50° C. to 0° C., and especially −50° C. to −10° C., in order to provide good peelability and minimise the risk of tear. In addition, such a copolyester preferably has a melting point in the range from 90° C. to 250° C., more preferably 110° C. to 175° C., and particularly 110° C. to 155° C., in order to obtain an adequate heat-seal bond.

The in-line melt-coating process described above is particularly advantageous since the heat-sealable layer is applied to the substrate before imparting the final shrinkage characteristics thereto.

According to a further aspect of the invention, there is provided a multi-layer heat-sealable shrinkable film as described above, or an open-ended tube comprising a multi-layer heat-sealable shrinkable film as described above, obtainable by a process described above, and particularly a process comprising the steps of the melt-coating process described above.

One or more of the layers of the polymeric film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular, a layer may comprise a particulate filler which can improve handling and windability during manufacture. The particulate filler may, for example, be a particulate inorganic filler or an incompatible resin filler or a mixture of two or more such fillers.

By an "incompatible resin" is meant a resin which either does not melt, or which is substantially immiscible with the polymer, at the highest temperature encountered during extrusion and fabrication of the film. The presence of an incompatible resin usually results in a voided layer, by which is meant that the layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule. Preferred materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or, other modifier to promote or alter the degree to which the filler is compatible with the layer polymer.

Preferred particulate inorganic fillers include titanium dioxide and silica.

Titanium dioxide particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as the chloride process or the sulphate process. The titanium dioxide particles may be coated, preferably with inorganic oxides such as aluminium, silicon, zinc, magnesium or mixtures thereof. Preferably the coating additionally comprises organic compound(s), such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds. The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate. The coating layer on the titanium dioxide particles is preferably in the range from 1 to 12% of inorganic oxides, and preferably in the range from 0.5 to 3% of organic compound, by weight based upon the weight of titanium dioxide.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm.

The size distribution of the inorganic filler particles is also an important parameter, for example the presence of excessively large particles can result in the film exhibiting unsightly 'speckle', i.e. where the presence of individual filler particles in the film can be discerned with the naked eye. It is preferred that none of the inorganic filler particles should have an actual particle size exceeding 30 µm. Particles exceeding such a size may be removed by sieving processes which are known in the art However, sieving operations are not always totally successful in eliminating all particles greater than a chosen size. In practice, therefore, the size of 99.9% by number of the inorganic filler particles should not exceed 30 µm, preferably should not exceed 20 µm, and more preferably should not exceed 15 µm. Preferably at least 90%, more preferably at least 95% by volume of the inorganic filler particles are within the range of the volume distributed median particle diameter ±0.8 Ξm, and particularly ±0.5 µm.

Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In one embodiment, the film of the present invention is optically clear, preferably having a % of scattered visible light (haze) of <10%, preferably <6%, more preferably <3.5% and particularly <2%, measured according to the standard ASTM D 1003. In this embodiment, filler is typically present in only small amounts, generally not exceeding 0.5% and preferably less than 0.2% by weight of a given layer.

In an alternative embodiment, the film is opaque and highly filled, preferably exhibiting a Transmission Optical Density (TOD) (Sakura Densitometer, type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. The film is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in a given layer is preferably in the range from 1% to 30%, more preferably 3% to 20%, particularly 4% to 15%, and especially 5% to 10)% by weight, based on the weight of the layer polymer.

The surface of an opaque film preferably exhibits a whiteness index, measured as herein described, in the range from 60 to 120, more preferably 80 to 110, particularly 90 to 105, and especially 95 to 100 units.

The surface of the substrate in contact with the heat sealable layer is referred to herein as the primary side. The surface of the substrate opposite to the surface which is in contact with the heat-sealable layer is referred to herein as the secondary side. The secondary side of the substrate may have thereon one or more further polymeric layers or coating materials. Any coating of the secondary side is preferably performed "in-line".

In one embodiment, the additional coating on the secondary side may comprise a "slip coating" in order to improve the handling and windability of the film, particularly when the film substrate is a PET polyester substrate. A suitable slip coating may be, for instance a discontinuous layer of an acrylic and/or methacrylic polymeric resin optionally further comprise a cross-linking agent, such as described in EP-A-0408197, the disclosure of which is incorporated herein by reference. An alternative slip coating may comprise a potassium silicate coating, for instance as disclosed in U.S. Pat. Nos. 5,925,428 and 5,882,798, the disclosures of which are incorporated herein by reference.

In a further embodiment, the film has on one surface thereof, preferably on the secondary side of the substrate, a printable or ink-receiving layer, and optionally a primer layer (such as that disclosed in EP-0680409, EP-0429179, EP-0408197, EP-0576179 or WO-97/37849, the disclosures of which are incorporated herein by reference) between the film and the printable or ink-receiving layer in order to increase adhesion. Suitable printable or ink-receiving layers are disclosed in, for instance, EP-0696516, U.S. Pat. No. 5,888,635, U.S. Pat. No. 5,663,030, EP-0289162, EP-0349141, EP-0111819 and EP-0680409, the disclosures of which are incorporated herein by reference. It is also possible to "reverse print" the heat-sealable layer as is well known in the art.

A preferred ink-receiving layer comprises an acrylic and/or methacrylic polymeric resin, as disclosed in EP-A-0408197. A preferred receiving layer polymer comprises alkyl acrylate monomer units and alkyl methacrylate monomer units. In a preferred embodiment, the polymer comprises ethyl acrylate and alkyl methacrylate. Preferably, the alkyl methacrylate is methyl methacrylate. In a preferred embodiment, the alkyl acrylate monomer units are present in a proportion in the range of from about 30 to about 65 mole % and the alkyl methacrylate monomer units are present in a proportion in the range of from about 20 to about 60 mole %. In a particularly preferred embodiment, the polymer comprises about 35 to 60 mole % ethyl acrylate, about 30 to 55 mole % methyl methacrylate and about 2 to 20 mole % methacrylamide. Such polymers may be applied to the substrate as an aqueous dispersion or alternatively as a solution in organic solvent. Application from an aqueous medium is preferred. The polymer composition may be applied to an already oriented film substrate. However, application of the primer coating is preferably effected before or during the stretching operation(s). Where the substrate is biaxially oriented, the ink-receiving layer is preferably applied between the two stages (longitudinal and transverse) of the biaxial stretching operation.

According to a further aspect of the present invention there is provided a process for the production of an open-ended tube comprising multi-layer polymeric film walls which comprises the steps of:

(i) forming a polymeric film substrate having a degree of shrinkage in one dimension (preferably the machine dimension) of about 0% to about 50% over the temperature range 55 to 100° C., and a degree of shrinkage in the other dimension (preferably the transverse dimension) of about 5 to about 70% over the temperature range 55 to 100° C.;

(ii) providing a heat-sealable layer on a first surface of said polymeric film substrate herein said heat-sealable layer is provided by coextrusion of the respective film-forming polymeric materials of the substrate and heat-sealable layers or by coating a surface of the substrate with the polymeric material of the heat-sealable layer, (iii) optionally providing a printable or ink-receiving layer on the surface of the substrate opposite to the surface which is in contact with the heat-sealable layer, and optionally printing onto said printable or ink-receiving layer, (iv) optionally incorporating separating means in the film, for instance by forming a plurality of sets of substantially parallel perforations in the film; and (v) forming an open-ended tube by sealing one end portion of the film to the other end portion of the film, for instance using a fin seal or an overlap seal.

In the process for the production of an open-ended tube described above, step (iv) may be performed after step (v), but is preferably conducted before step (v).

A "fin seal" may be formed by contacting the two ends of the film such that the contact is between the two heat-sealable layers, as shown in FIG. 3a. An "overlap seal" may be formed by contacting the two ends of the film such that the contact is between the heat-sealable layer of one end of the film, and the substrate layer of the other end of the film, as shown in FIG. 3b. The heat-seal bond is formed by the application of temperature and optionally pressure using conventional equipment in the area of contact. Conveniently, a fin seal or an overlap seal are effected by contacting a region of about 0.5 to 2 cm of each end of the film with the other end of the film. The heat-seal bond may be formed at temperatures in the range of about 110 to about 150° C.

According to a further aspect of the invention, there is provided the use of the multi-layer polymeric film described herein in the manufacture of packaging for a container suitable as a receptacle for a ready-prepared ovenable meal, wherein said packaging is in the form of an open-ended tube or sleeve within which is disposed the container, and wherein a first (lid) portion of said packaging seals said container, and where a second (base) portion of said packaging is separable from said first (lid) portion prior to the cooking cycle of said ovenable meal.

According to a further aspect of the invention, there is provided the use of open-ended tube described herein as packaging for a container suitable as a receptacle for a ready-prepared ovenable meal, wherein said container is disposed within said open-ended tube, and wherein a first (lid) portion of said packaging seals said container, and where a second (base) portion of said packaging is separable from said first (lid) portion prior to the cooking cycle of said ovenable meal.

The container may be, for instance, a thermoformed tray, thermoformed bowl or blow-moulded bottle. The container may be formed of polyester, such as polyethylene terephthalate, or of polypropylene, polystyrene, or may be PVDC coated, or may be glass. The invention is particularly suitable for use with an APET/CPET container, especially a thermoformed tray, which is suitable for packaging food or drink. Other suitable types of container include a foil tray particularly an aluminium foil tray), a metallised tray and a tray formed from PET-coated cartonboard or paperboard. Of particular utility are trays formed from metallised (particularly flash-metallised) PET cartonboard. For example, the tray may be produced from PET which has been metallised to an optical density in the range of about 0.01 to 4.0 and which is laminated to cartonboard. In one embodiment, the tray is a susceptor tray made from materials such as those disclosed in GB-A-2280342, EP-A-0563442 or GB-A-2250408, or is a susceptor tray produced in accordance with the disclosures of these documents, which are incorporated herein by reference.

According to a further aspect of the invention, there is provided a method of sealing a container suitable for use as a receptacle for ready prepared convenience foods, said method comprising the steps of:
(i) forming a polymeric film substrate having a degree of shrinkage in one dimension (preferably the machine dimension) of about 0% to about 50% over the temperature range 55 to 100° C., and a degree of shrinkage in the other dimension (preferably the transverse dimension) of about 5% to about 70% over the temperature range 55 to 100° C.;
(ii) providing a heat-sealable layer on a first surface of said polymeric film substrate wherein said heat-sealable layer is provided by coextrusion of the respective film-forming polymeric materials of the substrate and heat-sealable layers or by coating a surface of the substrate with the polymeric material of the heat-sealable layer,
(iii) optionally providing a printable or ink-receiving layer on the surface of the substrate opposite to the surface which is in contact with the heat-sealable layer, and optionally printing onto said printable or ink-receiving layer,
(iv) optionally incorporating separating means in the film, for instance by forming a plurality of sets of substantially parallel perforations in the film;
(v) positioning said multi-layer polymeric film over or around the container, such that said heat-sealable layer of the film is in contact with the container, and such that where said separating means are present the portion of the film which is contacted with the container is the portion of the film which is between two of said separating means;
(vi) effecting a seal between the film and the surfaces of the container which define the open end of the container, thereby defining a "lid portion" of the film;
(vii) forming an open-ended tube by sealing one end portion of the film to the other end portion of the film, for instance using a fin seal or an overlap seal, such that the container is positioned within the tube; and
(viii) exposing the container and sealed tube to heat in order to effect shrinkage of the tube, such that the tube fits closely and securely around the container.

In the method of sealing a container described above, step (vii) may be conducted before steps (v) and (vi), but is preferably conducted after steps (v) and (vi). In addition, step (iv) may be conducted before or after step (vii), but is preferably conducted before. Equally, step (iv) may be conducted before or after step (viii), but is preferably conducted before.

The invention further provides a sealed container comprising a receptacle containing food or drink, and a packaging sleeve formed from a polymeric tube as defined herein. The packaging sleeve comprises a lid portion which forms a seal over the open end of the container, and a base portion which surrounds opposing sides and the underside of the container, preferably wherein the base portion and the lid portion are separated by, and separable by virtue of, two separating means such as two series of substantially parallel perforations.

The sealed container is produced by techniques well-known to those skilled in the art. Once the food to be packaged has been introduced into the container, the heat-sealable film or tube is affixed using temperature and/or pressure using conventional techniques and equipment. The multi-layer film or tube is placed on the container such that the heat-sealable layer is in contact with the surfaces of the container. Heat-sealing is generally effected using heat-seal equipment operating at a temperature in the range of about 110 to 200° C., preferably about 110 to 150° C., and typically at about 130° C.

The present invention is particularly suitable for use in association with a receptacle for ready prepared convenience foods which may be warmed in a microwave oven. However, the invention is also applicable for ready-prepared meals which are intended to be warmed in any other type of oven, such as a conventional convection oven, a direct radiation oven and a forced hot air oven.

The invention is illustrated by FIGS. 1 and 6 herein, in which:

FIG. 1 is a sectional view of the film (4) according to the present invention comprising a substrate layer (1), a heat-sealable layer (2), and a printable layer (3).

FIG. 2 is a sectional view of the film (4) after having been heat-sealed to the container (6) having food product (S) therein. The heat-seal layer (2) is in contact with the container with the substrate layer (1) uppermost. The heat seal is effected at locations marked by the the arrows.

FIG. 3a is a view of the container (6) surrounded by the film (4), just prior to the formation of a fin seal. FIG. 3b is a view of the container (6) surrounded by the film (4), just prior to the formation of an overlap seal.

FIG. 4 is a sectional view of container (6) surrounded by the tube of the present invention which has been fin-sealed and heat shrunk for a tight secure fit of the tube around the contained. The arrows (7) show the location of the perforations.

Figure 5:
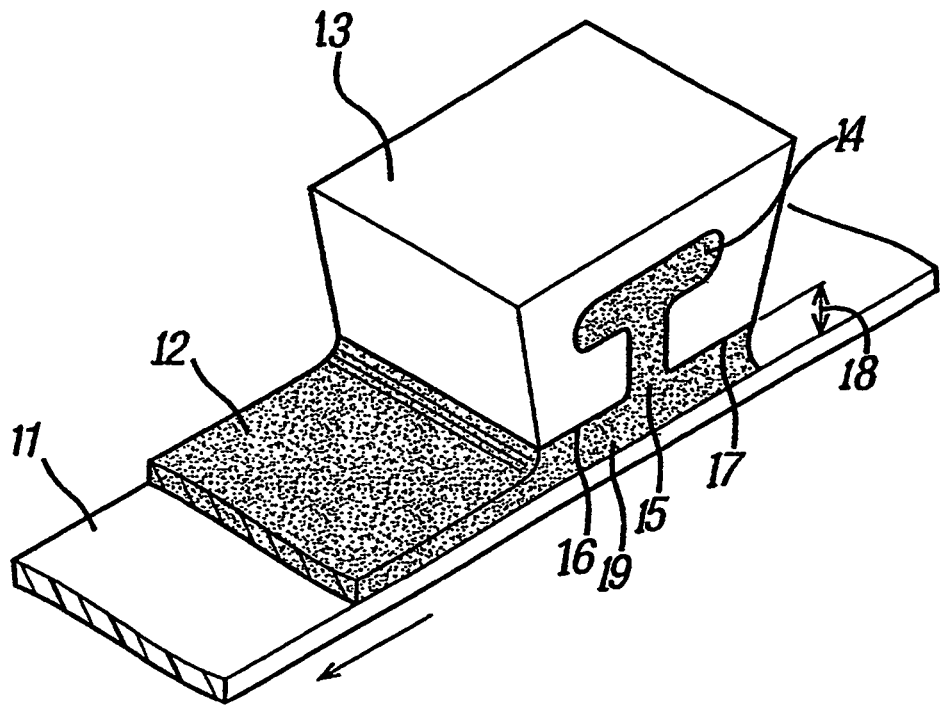
Figure 6:
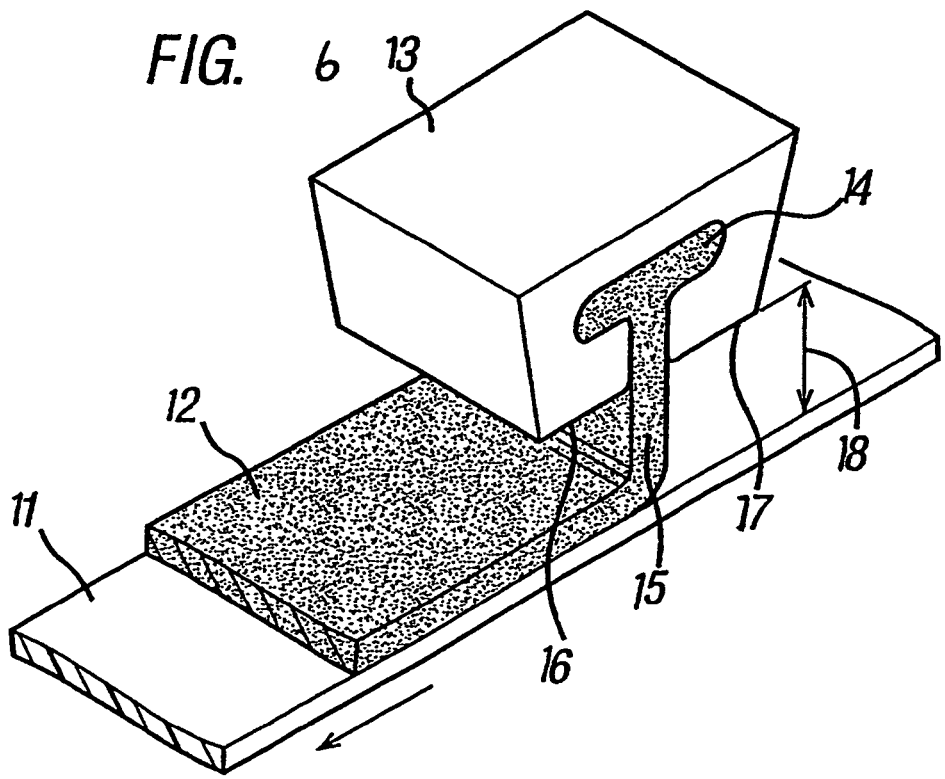

FIG. 5 shows a polymeric substrate (11) being melt-coated with a coating liquid (12) from a coating die (13), said die comprising a distribution chamber (14), a feed slot (15), a downstream lip (16) and an upstream lip (17). The substrate (11) and the die lips (16,17) define a coating gap (18), in which there is formed a coating bead (19). The film is moving in the direction shown by the arrow. An extrusion-coating arrangement is shown in FIG. 6, the numbering of the elements corresponding to that of FIG. 5.

The following test methods may be used to determine certain properties of the polymeric film:
(i) Wide angle haze is measured using a Hazegard System XL-211, according to ASTMD 1003-61.
(ii) Whiteness index is measured using a Colorgard System 2000, Model/45 (manufactured by Pacific Scientific) based on the principles described in ASTM D313.
(iii) Heat-seal strength is measured as follows. The film is sealed, by means of the heat-sealable layer, to a standard APET/CPET tray using a Microseal PA 201 (obtained from Packaging Automation Ltd, England) tray sealer at a temperature of 180° C., and pressure of 80 psi for two seconds. Strips of the sealed film and tray are cut out at 90° to the seal, and the load required to pull the seal apart measured using an Instron operating at a crosshead speed of 0.2 mmin$^{-1}$. The procedure is generally repeated 4 times, and a mean value of 5 results calculated.
(iv) Shrinkage at a given temperature is measured by placing the sample in a heated water bath at that temperature for 30 seconds. The shrinkage behaviour over the range 55 to 100° C. is assessed using a number of film samples at different temperatures over this range, generally at intervals of 5 to 10° C.

The invention is further illustrated by the following examples. It will be appreciated that the examples are for illustrative purposes only and are not intended to limit the invention as described above. Modification of detail may be made without departing from the scope of the invention.

EXAMPLES

Example 1

A polymer composition comprising a copolyester of 18 mol % ethylene isophthalate and 82 mol % ethylene terephthalate was extruded. The film was cast onto a cooled rotating drum and then forward drawn at a ratio of 1.02 and then passed into a melt coater where it was coated with a copolyester of sebacic acid/terephthalic acid/butylene glycol (50/50/100; $T_g$ of −40° C.; $T_m$ of 117° C.) and then passed into a stenter oven at a temperature of about 90° C. where the film was stretched in the sideways direction to approximately 3.8 times its original dimensions. The film was not heat-set in the conventional way but wound up after coming to ambient temperature. The thickness of the heat sealable polymer was 3 µm and the total film thickness was 39 µm.

The film shrinkage was measured in accordance with the procedure described herein and found to be 5% in the machine direction and 45% in the transverse direction.

The multi-layer film prepared in accordance with the above procedure was placed over a APET/CPET tray (Faerch A/S, Denmark) such that a portion of the film (the "lid portion") covered the tray, with the remainder of the film extending beyond the walls of the tray. The tray was sealed using a Sentinel Heat Sealer (Packaging Industries, USA) at a temperature of 130° C. and a pressure of 40 psi for 0.5 sec.

The two opposite ends of the film were wrapped around opposing sides of the tray and brought together on the underside of the tray such that approximately 1 cm of each end of the film was contacted together with the two heat-sealable surfaces in contact. A fin seal was formed by heat-sealing the two ends by the application of temperature (about 130° C.) and pressure using conventional equipment.

The underside of the tray was then exposed to heat at 100° C. for 5 seconds to effect shrinkage of the tube in order to provide a tight, secure packaging around the container.

Example 2

The procedure of Example 1 was repeated except that an additional layer was applied to the surface of the substrate opposite to the surface onto which the heat-sealable layer is applied. The additional layer was a printable layer and comprised AC201® (Rohm and Haas) which comprises a 46% solids aqueous dispersion of a copolymer of ethyl acrylate (EA; 48 mole %), methyl methacrylate (MA; 48 mole %) and methacrylamide (MA; 4 mole %). The printable layer was applied to the substrate according to conventional techniques after the forward stretching step and before the transverse stretching step.

Example 3

A polymer composition comprising a copolyester of 18 mol % ethylene isophthalate and 82 mol % ethylene terephthalate was co-extruded with a copolyester of terephthalic acid/1,4-cyclohexane dimethanol/ethylene glycol (100/33/67) to form an ABA structure, the core layer (B) being the ethylene isophthalate/ethylene terephthalate copolyester. The film was cast onto a cooled rotating drum and then forward drawn at a ratio of 1.02 and then passed into a melt coater where it was coated with the heat-sealable polymer described in Example 1 and then passed into a stenter oven at a temperature of about 90° C. where the film was stretched in the sideways direction to approximately 3.8 times its original dimensions. The film was not heat-set in the conventional way but wound up after coming to ambient temperature. The thickness of the heat-sealable polymer was 3 µm and the total film thickness was 39 µm.

A sealed container was then prepared according to the procedure in Example 1.

Example 4

A polymer composition comprising a copolyester of 12 mol % ethylene isophthalate and 88 mol % ethylene terephthalate was co-extruded with a copolyester of terephthalic acid/1,4-cyclohexane dimethanol/ethylene glycol (100/33/67) to form an AB structure, the core layer (B) being the ethylene isophthalate/ethylene terephthalate copolyester. The film was cast onto a cooled rotating drum and then forward drawn at a ratio of 1.02 and then passed into a melt coater where it was coated with the heat-sealable polymer described in Example 1 and then passed into a stenter oven at a temperature of about 90° C. where the film was stretched in the sideways direction to approximately 3.8 times its original dimensions. The film was not heat-set in the conventional way but wound up after coming to ambient temperature. The thickness of the heat-sealable polymer was 2 µm and the total film thickness was 38 µm.

A sealed container was then prepared according to the procedure in Example 1.

Example 5

A polymer composition comprising a copolyester of 10 mol % ethylene isophthalate and 90 mol % ethylene terephthalate was co-extruded with a copolyester of terephthalic acid/1,4-cyclohexane dimethanol/ethylene glycol (100/33/67) to form an ABA structure, the core layer (B) being the ethylene isophthalate/ethylene terephthalate copolyester. The film was cast onto a cooled rotating drum and then forward drawn at a ratio of 1.12 and then passed into a stenter oven at a temperature of about 90° C. where the film was stretched in the sideways direction to approximately 3.8 times its original dimensions. The film was heat-set in the conventional way at a temperature of 130° C. The heat-set film was then coated off-line using conventional solvent coating means with a copolyester of sebacic acid/terephthalic acid/butylene glycol (50/50/100) to give a dry coating thickness of 2 µm. The total film thickness was 39 µm.

The film shrinkage was measured as described herein and found to be 2% in the machine direction and 25% in the transverse direction.

The invention claimed is:

1. An open-ended tube comprising walls of a heat-sealable multi-layer polymeric film, wherein said film comprises an outer shrinkable substrate layer and an inner heat-sealable layer, wherein said substrate layer has a degree of shrinkage in a longitudinal dimension of the tube of about 0% to about 50% when heated from ambient temperature to a temperature in the range of 55 to 100° C., and a degree of shrinkage in a transverse dimension of the tube of about 5 to about 70% when heated from ambient temperature to a temperature in the range of 55 to 100° C., wherein said multi-layer film comprises a plurality of separating means which enable one multi-layer portion of said film to be separated from an adjacent multi-layer portion of said film.

2. The tube according to claim 1 wherein the ratio of shrinkage at 100° C. in the transverse dimension relative to that in the longitudinal dimension is in the range from 1:1 to 10:1.

3. The tube according to claim 1 wherein the ratio of shrinkage at 100° C. in the transverse dimension to that in the longitudinal dimension is greater than 1:1.

4. The tube according to claim 1 wherein the substrate layer has a degree of shrinkage in the longitudinal dimension of the tube of about 0% to about 10% when heated from ambient temperature to a temperature in the range of 55 to 100° C., and a degree of shrinkage in the transverse dimension of the tube of about 5% to about 20% when heated from ambient temperature to a temperature in the range of 55 to 100° C.

5. The tube according to claim 1 wherein the substrate layer comprises polyester.

6. The tube according to claim 1 wherein the substrate layer comprises poly(ethylene terephthalate) or a copolyester in which the major repeat unit is ethylene terephthalate.

7. The tube according to claim 1 wherein the substrate layer comprises two or three discrete layers.

8. The tube according to claim 1 wherein the heat-sealable layer comprises a copolyester of an aromatic dicarboxylic acid, an aliphatic dicarboxylic acid and a glycol.

9. The tube according to claim 8 wherein said copolyester of the heat-sealable layer comprises terephthalic acid, sebacic acid and butylene glycol.

10. The tube according to claim 9 wherein said copolyester is a copolyester of butylene glycol with about 50% terephthalic acid and about 50% sebacic acid.

11. The tube according to claim 1 wherein said film further comprises a printable or ink-receiving layer disposed on a surface of the substrate layer opposite to the heat-sealable layer.

12. The tube according to claim 11 wherein the printable or ink-receiving layer polymer is an acrylic and/or methacrylic polymeric resin.

13. The tube according to claim 11 wherein the printable or ink-receiving layer polymer comprises about 35 to 60 mole % ethyl acrylate, about 30 to 55 mole % methyl methacrylate and about 2 to 20 mole % methacrylamide.

14. The tube according to claim 1 wherein said heat-sealable multi-layer film is peelable.

15. The tube according to claim 1 wherein each of said separating means comprises one or two sets of perforations extending along a dimension of the tube which is substantially parallel to its longitudinal dimension.

16. The tube according to claim 1 wherein there are two separating means.

17. The tube according to any of claims 1 to 5 wherein the substrate layer comprises a copolyester of terephthalic acid (TPA) and isophthalic acid (IPA) with one or more diols selected from the group consisting of aliphatic and cycloaliphatic diols wherein the isophthalate polyester units and the terephthalate polyester units are present in relative amounts of from 1 to 40 mol % and from 99 to 60 mol %, respectively.

18. The tube according to claim 17 wherein the substrate layer comprises a first layer A and a second layer B, wherein layer B comprises the copolyester and layer A comprises a second copolyester of terephthalic acid with two or more aliphatic glycols, and wherein layer A is disposed in contact with the heat-sealable layer.

19. The tube according to claim 18 wherein the aliphatic glycols of the second copolyester are ethylene glycol and 1,4-cyclohexane dimethanol.

20. The tube according to claim 19 wherein the ethylene glycol and 1,4-cyclohexane dimethanol are incorporated in the second copolyester at about 65-70 mole % and about 30-35 mole %, respectively.

21. The tube according to claim 17 wherein the substrate layer comprises three layers in an ABA sequence, wherein layer B comprises the copolyester and layers A each comprise a second copolyester of terephthalic acid with two or more aliphatic glycols.

22. The tube according to claim 21 wherein the aliphatic glycols of the second copolyester are ethylene glycol and 1,4-cyclohexane dimethanol.

23. The tube according to claim 22 wherein the ethylene glycol and 1,4-cyclohexane dimethanol are incorporated in the second copolyester at about 65-70 mole % and about 30-35 mole %, respectively.

24. The tube according to claim 17 wherein said one or more diols is ethylene glycol.

25. The tube according to claim 24 wherein the substrate layer comprises a first layer A and a second layer B, wherein layer B comprises the copolyester and layer A comprises a second copolyester of terephthalic acid with two or more aliphatic glycols, and wherein layer A is disposed in contact with the heat-sealable layer.

26. The tube according to claim 25 wherein the aliphatic glycols of the second copolyester are ethylene glycol and 1,4-cyclohexane dimethanol.

27. The tube according to claim 26 wherein the ethylene glycol and 1,4-cyclohexane dimethanol are incorporated in the second copolyester at about 65-70 mole % and about 30-35 mole %, respectively.

28. The tube according to claim 24 wherein the substrate layer comprises three layers in an ABA sequence, wherein layer B comprises the copolyester and layers A each comprise a second copolyester of terephthalic acid with two or more aliphatic glycols.

29. The tube according to claim 28 wherein the aliphatic glycols of the second copolyester are ethylene glycol and 1,4-cyclohexane dimethanol.

30. The tube according to claim 29 wherein the ethylene glycol and 1,4-cyclohexane dimethanol are incorporated in the second copolyester at about 65-70 mole % and about 30-35 mole %, respectively.

31. The tube according to claim 17 wherein the substrate layer comprises a copolyester comprising substantially 18 mol % ethylene isophthalate and 82 mol % ethylene terephthalate.

32. The tube according to claim 31 wherein the substrate layer comprises a First layer A and a second layer B, wherein layer B comprises the copolyester and layer A comprises a second copolyester of terephthalic acid with two or more aliphatic glycols, and wherein layer A is disposed in contact with the heat-sealable layer.

33. The tube according to claim 32 wherein the aliphatic glycols of the second copolyester are ethylene glycol and 1,4-cyclohexane dimethanol.

34. The tube according to claim 33 wherein the ethylene glycol and 1,4-cyclohexane dimethanol are incorporated in the second copolyester at about 65-70 mole % and about 30-35 mole %, respectively.

35. The tube according to claim 31 wherein the substrate layer comprises three layers in an ABA sequence, wherein layer B comprises the copolyester and layers A each comprise a second copolyester of terephthalic acid with two or more aliphatic glycols.

36. The tube according to claim 35 wherein the aliphatic glycols of the second copolyester are ethylene glycol and 1,4-cyclohexane dimethanol.

37. The tube according to claim 36 wherein the ethylene glycol and 1,4-cyclohexane dimethanol are incorporated in the second copolyester at about 65-70 mole % and about 30-35 mole %, respectively.

* * * * *